US012798685B2

(12) United States Patent
Vollmer et al.

(10) Patent No.: US 12,798,685 B2
(45) Date of Patent: Nov. 17, 2026

(54) CLOSING DISC AS WELL AS METHOD AND APPARATUS FOR SEALINGLY CLOSING AN OPENING OF A CARRIER COMPONENT HAVING SUCH A CLOSING DISC

(71) Applicant: Illinois Tool Works Inc., Glenview, IL (US)

(72) Inventors: Gerit Vollmer, Linden (DE); Alexander Limpert, Weikersheim (DE); Paul Ring, Burgthann (DE)

(73) Assignee: Illinois Tool Works Inc., Glenview, IL (US)

( * ) Notice: Subject to any disclaimer, the term of this patent is extended or adjusted under 35 U.S.C. 154(b) by 503 days.

(21) Appl. No.: 18/232,709

(22) Filed: Aug. 10, 2023

(65) Prior Publication Data

US 2024/0051614 A1 Feb. 15, 2024

(30) Foreign Application Priority Data

Aug. 11, 2022 (DE) ..................... 10 2022 120 370.0
Jul. 18, 2023 (DE) ..................... 10 2023 119 003.2

(51) Int. Cl.
*B62D 25/24* (2006.01)
*F16J 13/02* (2006.01)

(52) U.S. Cl.
CPC .............. *B62D 25/24* (2013.01); *F16J 13/02* (2013.01)

(58) Field of Classification Search
CPC . B62D 25/24; F16J 13/02; B60R 13/08–0892
USPC ........................................................ 296/1.06
See application file for complete search history.

(56) References Cited

U.S. PATENT DOCUMENTS

| | | | | |
|---|---|---|---|---|
| 7,870,648 B2 * | 1/2011 | Schaty | C09J 5/06 | 24/453 |
| 2008/0029919 A1 * | 2/2008 | Howe | B29C 44/188 | 264/46.5 |
| 2016/0244104 A1 * | 8/2016 | Kuhm | B62D 25/24 | |
| 2017/0152948 A1 * | 6/2017 | Huebner | B62D 25/24 | |
| 2019/0134817 A1 * | 5/2019 | Turner | B62D 65/02 | |
| 2024/0174300 A1 * | 5/2024 | Ventalló | B62D 25/24 | |

FOREIGN PATENT DOCUMENTS

| | | | | |
|---|---|---|---|---|
| DE | 102022003853 A1 * | 12/2022 | G01M 17/00 |
| EP | 0779203 A1 * | 6/1997 | B65D 43/022 |
| FR | 2507277 A1 * | 12/1982 | B62D 25/24 |
| GB | 1288392 A * | 9/1972 | F16J 13/00 |
| GB | 1583044 A * | 1/1981 | B62D 25/24 |
| GB | 2625633 A * | 6/2024 | F16J 13/00 |
| JP | 3311546 B2 * | 8/2002 | |

OTHER PUBLICATIONS

Bockenheimer (EP 0779203 A1), machine translation (Year: 1997).*

* cited by examiner

*Primary Examiner* — Wenwei Zhuo
(74) *Attorney, Agent, or Firm* — McAndrews, Held & Malloy, Ltd.

(57) ABSTRACT

According to the disclosure, a closing disc is provided for closing openings, in particular in motor vehicles. It comprises a plate-shaped carrier body made of a hard component with a covering side and a closing side, and a soft component arranged on the closing side, wherein the soft component is formed from a heat-activatable adhesive material, and wherein the closing disc is free of latching means or comprises no latching and/or fastening means.

19 Claims, 6 Drawing Sheets

CLOSING DISC AS WELL AS METHOD AND APPARATUS FOR SEALINGLY CLOSING AN OPENING OF A CARRIER COMPONENT HAVING SUCH A CLOSING DISC

RELATED APPLICATIONS

The present application claims the benefit of German Patent Application No. DE 10 2022 120 371.9, filed Aug. 11, 2022; and No. DE 10 2022 120 370.0, filed Aug. 11, 2022, and No. DE 10 2023 119 003.2, filed Jul. 18, 2023, each titled "Closing Disc as well as Method and Apparatus for Sealingly Closing an Opening of a Carrier Component Having such a Closing Disc," the contents of which are hereby incorporated by reference.

BACKGROUND

In vehicle bodies, a plurality of holes and openings are provided so as to make vehicle cavities, such as the sills, accessible from the outside, in particular to make them accessible for the entry of corrosion protection agents. For all of these processes, it is necessary that the respective liquids can enter the cavities of a body and also flow back out. For this purpose, the body has openings, in particular holes, which are to be subsequently closed so as to prevent the entry of dirt and liquids. Moreover, vehicle bodies also have holes that serve to accomplish the production process of alignment of individual body components until their integration into the overall body.

The known holes or openings are typically sealed with rubber-elastic plugs. For this purpose, typical rubber-elastic plugs have a central cavity in the form of a flat cup- or bowl-shaped region, which is delimited by a first side wall and a first wall terminating on one side, which is customary in this field.

U.S. Pat. No. 6,319,436 B1 discloses a closing plug for closing an opening in a planar surface with a plurality of retaining hooks and a circumferential seal, wherein ribs extend from a bottom side of a transverse surface of the plug, which ribs are formed as guide elements upon insertion of the plug. Here, the plug is formed from a hard plastic.

A plug for closing holes in planar objects is known from JP 61-59067, wherein said plug is formed from an elastic material and has a first inner circumferential wall, which, in one example, has an outer circumferential step and a sealing lip that interacts with the former, by which means a hole can be closed accordingly. In addition, the plug can be formed as a wave in cross-section with a circumferential V-groove on the top side in which four ribs are formed.

From US 2015/0135598 A1, a rubber-elastic plug is known, which consists of a circumferential wall and a sealing lip formed from the former, wherein an inner, dome-like elevation is arranged on an inner circumferential surface of the wall, wherein the ceiling of the dome-like elevation is formed with ribs.

EP 2 810 855 A1 discloses a closing plug for sealing an opening in a component. This comprises a substantially annular or cylindrical shaft, which is interrupted by ribs that are open to the outside and are hollow. Furthermore, a cone-shaped sealing lip is provided on the shaft, wherein at least one flexible folding zone is provided on the sealing lip, which is reversibly foldable such that, in a folded state of the folding zone, the circumference of the sealing lip in the region of the folding zone and/or an edge of the sealing lip is reduced.

EP 2 781 806 A1 discloses a plug for closing openings. This plug comprises a radially circumferential side wall as well as a sealing surface formed on the side wall, wherein struts can be provided in the region between the circumferential side wall. According to an example, it can be provided in this case that the struts extend up to an annular element arranged concentrically to the circumferential side wall, or it is provided that the struts terminate in the region of a central actuation trough configured in the upper wall of the plug.

In DE 201 07 612 U1, a closing lid for closing an opening is disclosed. This closing lid comprises a base body with a circumferential collar that transitions into an elastic sealing lip that abuts one side of a beam. This closing cover can have struts that do not extend from one side of the collar or a radially circumferential side wall to the other. According to a further example, the closing lid can have a grid-like stiffening structure, wherein corresponding interstices of the grid-like stiffening structure are foamed with PVC.

From EP 2 873 894 A1, a closing plug for closing an opening is known. This comprises an annular sealing portion and a spreading portion configured integrally with the sealing portion. This closing plug can also have struts that are delimited approximately at the center of the closing plug by an element arranged concentrically to the annular sealing portion.

DE 10 2009 057750 A1 describes an apparatus for insertion into an opening of a component of an automobile. Here, a thermoplastic adhesive material is applied circumferentially on a flange, which, when heated, adhesively seals the flange to a component surface. The remaining regions of this apparatus are formed from a different plastic, wherein this apparatus can be produced by means of a 2-component injection molding process.

A closing plug is described in CN 206 938 651 U, which is produced by means of a 2-component injection molding process, wherein a sealing portion can be formed from a thermoplastic adhesive material, and a base body is formed from a hard component. The sealing body can have an upper wall in the connecting region with the base body, which wall is formed by thin-walled struts in order to manufacture the base body 100 from the hard component and the sealing body from the thermoplastic adhesive material by means of a 2-component injection molding process and to connect them to one another.

SUMMARY

The present disclosure relates to a closing disc, substantially as illustrated by and described in connection with at least one of the figures, as set forth more completely in the claims. More specifically, the present disclosure relates to a closing disc, as well as to a method and an apparatus for sealingly closing an opening of a carrier component, in particular of a motor vehicle, having such a closing disc.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
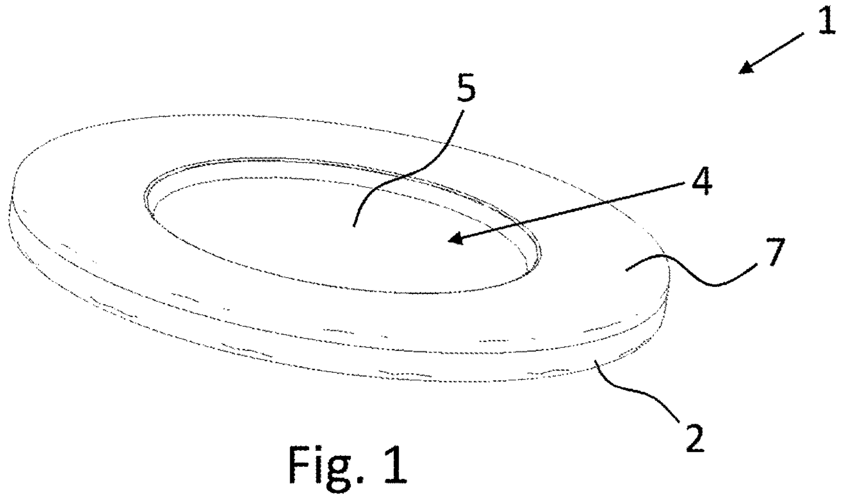
FIG. 1 illustrates a perspective aerial view of a closing side of a closing disc according to an aspect of the disclosure.

The problem addressed by the present disclosure is to provide a closing disc for closing openings, in particular in motor vehicles, as well as a method and an apparatus for sealingly closing openings, in particular in motor vehicles, which represent an alternative to sealing plugs and methods known in the prior art. A further problem addressed by the present disclosure is to provide a closing disc and a method as well as an apparatus for closing openings with such a closing disc that securely and reliably seal openings. Furthermore, a problem addressed by the present disclosure is to create a closing disc as well as a method and an apparatus for closing openings with such a closing disc that are simple and thus inexpensive to manufacture. In addition, a problem addressed by the present disclosure is to create a closing disc and a method by which contaminants can be removed from a connecting region of a closing disc and a component in order to form a reliable connection.

According to the disclosure, a closing disc for closing openings, in particular in motor vehicles, is provided according to a first example. It comprises a plate-shaped carrier body made of a hard component with a covering side and a closing side, and a soft component arranged on the closing side, wherein the soft component is formed from a heat-activatable adhesive material, and wherein the closing disc is free of latching means or comprises no latching and/or fastening means.

The soft component can be arranged only on the closing side or on both sides and thus on the closing side and the covering side. Furthermore, the carrier body can be flat and can comprise only the soft component. In the context of the present disclosure, the feature that the closing side and/or the covering side only comprise the soft component and are configured flat is understood to mean that the carrier body does not have any grooves, recesses, or undercuts, in particular on the closing side and/or the covering side. In addition, the feature that the soft component is only provided on the surface of the closing disc and/or, if necessary, on the surface of the covering side can be understood to mean that the soft component is not arranged on a radially or tangentially circumferential edge of the carrier body. In this way, a very simple construction of the closing disc according to the disclosure results. In contrast to sealing plugs known from the prior art, it is provided in the closing disc according to the disclosure that this is only applied to the edge of a carrier component that delimits an opening. Closing plugs known from the prior art are not formed in a disc-shaped fashion, because they are inserted into openings of carrier components and mostly comprise latching means or undercuts. The plate-shaped and preferably planar carrier body can be configured, for example, completely circular disc-shaped in order to close circular holes or ovally or elliptical in order to close oblong holes. This means that the geometry of the carrier body corresponds approximately to the shape of the hole to be covered and has a larger surface region than a hole to be closed in order to ensure a corresponding connection of the soft component to the component comprising the opening to be closed.

According to the disclosure, it is provided that the soft component is provided at least on the edge of a carrier component of the closing side that delimits an opening. In particular, it can be provided in this case that, after activation, the soft component or the adhesive or hot-glue material enters into an inner sheath wall that delimits the opening and corrosion protection is thus achieved in the region of the opening by the soft component. In addition, the increased adhesive surface allows for higher retention forces.

Due to the fact that the closing disc according to the disclosure is plate-shaped or circular disc-shaped, openings or openings with different hole diameters or different diameters of a single size can be covered by closing discs. In addition, the closing disc according to the disclosure is extremely simple and consists only of two simply configured components, namely the carrier body and the soft component. The soft component can be configured such that it is not tacky or has no adhesive properties as delivered, so that no contaminants can adhere to it. The soft component can be arranged fully on the closing side.

The soft component can alternatively be annular disc-shaped or circular annular disc-shaped and can terminate approximately flush with a tangential or radially circumferential side wall of the carrier body. In this respect, it can be provided that the soft component or the adhesive component covers at least about 10% or 20% or 30% to about 50% or 60% or 70% or 80% or 90% or 100% of a surface of the closing side of the carrier body. Alternatively, the soft component can be arranged as a substantially or completely circumferential band (e.g., circular annular or circular disc-shaped) on both sides of the carrier body (2).

The hard component can be formed from PPT (polytrimethylene terephthalate) or PPA (polyphthalamide), in particular with glass fibers, and in particular from a recyclate.

Polyamides and other thermoplastics that can be processed in the injection molding method are also possible in order to form the hard component.

The soft component or adhesive component can be formed from TPE (thermoplastic elastomer) or TPS (terephthalic acid) and in each case a heat-activatable adhesive or EVA (ethylene vinyl acetate). Ethyl vinyl acetate copolymers (EVAC or also EVA) are copolymers made from ethylene and vinyl acetate. The soft component preferably has a lower melting temperature than the hard component. Due to the fact that the hard component has a higher melting temperature than the soft component, the hard component does not melt upon activation of the soft component.

On the carrier body, a preferably circular cylindrical centering/distancing element can be integrally formed on the closing side. By providing such a centering/distancing element, the closing disc can be arranged centered on an opening of a carrier component. In particular, in the case of a vertical arrangement of an opening of a carrier component, the centering/distancing element is advantageous, because this prevents the closing disc from sliding, because the centering/distancing element slightly enters the opening and thus keeps the closing disc in place, i.e., correctly positioned. In addition, the centering/distancing element can be used as a positioning aid, for centering, and for avoiding incorrect assembly. If the centering/distancing element is not arranged at an opening, the soft component will be contacted, and an incorrectly positioned closing disc will not be able to be mounted, because the adhesive layer will not interface with a carrier component. However, providing such a circular cylindrical centering/distancing element is not preferred.

It can preferably be provided that the carrier body is configured so as to be fully circular disc-shaped and comprises a planar covering side and a closing side that is similarly planar with the exception of a centering/distancing element, if present, and a planar, radially circumferential side wall, such that a surface of the carrier body only consists of these three planar surfaces.

In the context of the present disclosure, a fully planar covering side of the carrier body is thus understood to be free of undercuts, latching means, edges, or the like. However, on the covering side and/or the closing side, for example in the center, a sprue for producing the closing disc by means of an injection molding process as well as an opening for introducing the soft component via the hard component can be provided during manufacture by means of a 2-component injection molding process. Thus, the closing disc according to the disclosure is extremely simply constructed, because no undercuts, edges, latching means, or the like are present. Furthermore, according to the present disclosure, a method for producing a closing disc as described above is provided, wherein the closing disc is produced by means of a 2-component injection molding process.

In addition, according to the present disclosure, there is provided a method for sealingly closing an opening of a carrier component, in particular of a motor vehicle, with a closing disc as described above, wherein the closing disc is arranged on an edge that delimits an opening of a carrier component and in particular is configured so as to be arranged on an edge that delimits an opening of a carrier component, and subsequently a soft component of the closing disc is thermally activated such that the soft component melts and is sealingly connected to the edge of the opening. The soft component can be at least partially connected to an inner sheath wall of an opening of a carrier component.

The soft component can be melted by means of an ultrasonic device such that the soft component is welded in the region of an edge of an opening, and preferably at least partially welded to an inner sheath wall of an opening. In this way, a hot melt adhesive or the hot melt adhesive content in the soft component is activated by the heat of the ultrasonic waves and the closing disc is thereby welded to a carrier component, in particular of a vehicle body.

According to the disclosure, it is thus a thermoplastic pad or closing disc that is welded to a body by ultrasonic welding. The ultrasonic device can comprise a robotic arm having a sonotrode for melting. However, according to the method according to the disclosure, such a sonotrode preferably has no contact with the soft component in order to avoid adhering the soft portion to the sonotrode. It can also be contemplated that mechanical bonding elements contact the sonotrode. Accordingly, the ultrasonic waves are preferably applied to the hard component and transferred to the soft portion.

According to a second example, which can comprise the above features of the first example, it is provided that the soft component has a structure on the closing side. In this structure, discharge channels are configured so as to remove wax and/or impurities melted on a component during the application process, such that they can be discharged approximately radially outward when melting. That is to say, the structure forms discharge channels for removing wax and/or impurities that preferably extend substantially radially outward. For example, the structure can be configured as a corrugated structure, a diamond structure, a honeycomb structure, and thus a vectored structure having at least approximately radially outward extending discharge channels that can be connected to one another.

Furthermore, the carrier body of the closing disc formed from a hard component can be significantly thinner than in the first example. The carrier body has a wall thickness of approximately 0.6 mm or 0.8 mm or 0.9 mm or 1 mm. In order to compensate for the weakening associated with the thinner wall thickness of the carrier body, the closing disc according to the second example comprises on the closing side stiffening ribs that extend radially circumferentially and are equally spaced apart from one another in the radial outward direction. An example can also be provided, which is similar to the first example of the closing disc, in which the hard component is configured flat without stiffening struts, wherein only the soft component is configured in a correspondingly structured fashion.

In an alternative example of a closing disc according to the disclosure, the soft component can be applied in an annular or circular disc shape on both sides of the carrier body. In this case, one or more openings can then be provided radially circumferentially in order to apply the soft component on both sides to the carrier body of the closing disc. According to this example, the sonotrode can be placed on an inner surface, for example a circular surface, of the hard component.

According to a further example of a closing disc according to the disclosure, which can have the same technical features as the closing discs described above. The closing disc according to this example can comprise a centering/distancing element in addition to the aforementioned features, which can be combined as desired with one another.

This centering/distancing element serves as a centering aid for arranging the closing disc in a reproducible position on a closed opening, which is repeatedly the same mounting position. The centering/distancing element is integrally formed as a circular annular portion on the carrier body and connected thereto. That is to say, the centering/distancing element is also formed from the hard component, i.e., is a component of the carrier body. The centering/distancing element can be arranged in an opening that is to be closed in order to allow a reproducible and correct arrangement of the closing disc in an opening. With such a centering aid or the centering/distancing element, a corresponding process in which an inner sheath wall of a through-opening, in particular a sheet edge, is also to be sealed, is more easily reproducible.

In the case of closing discs according to the disclosure, it can further be provided that the soft component has an increased layer thickness at two diametrically opposed regions in order to compensate for any curvatures existing in the region of openings to be closed. This means that the closing disc or its soft component 7 has a slightly convex shape after application, in order to be applicable to curved surfaces, as well.

Closing discs according to the disclosure can also be applied internally to an opening of a component that is to be closed. The soft component, in particular if it is annular in shape, must have a significantly smaller inner diameter than the opening to be closed. In this way, when the soft component is activated, it can enter an inner sheath wall of the opening to be closed and can thus effectively protect it against corrosion.

In the event that a closing disc is applied from the outside to an opening of a component that is to be closed, this is not so critical, because the inner sheath wall of the opening to be closed is not exposed after the application of the closing disc.

A sealing of an opening from the inside results in significantly more freedom during assembly. That is to say, a closing disc mounted from the inside according to the disclosure is provided in particular for closing openings in vehicle bodies. Furthermore, according to the present disclosure, there is provided an apparatus for applying closing discs according to the present disclosure. This apparatus comprises a reservoir or a hopper for receiving the closing discs, respectively. The reservoir comprises a movable cylinder that allows the closing discs to be moved to a frontmost position of the reservoir.

A corresponding retention apparatus is also provided for fixing the closing discs in this position. A front closing disc is then inserted into a separating apparatus and pressed into a mounting position below a welding device for positioning. The welding device comprises a sonotrode, a booster, a converter, and a forward-feed unit which can be operated by the vibratory system. The vibratory system is connected to a generator that supplies the electrical waves to generate the ultrasonic waves in the converter. When using the laser welding or infrared process, the applicator differs in that the closing discs can be applied directly out of the magazine and no longer need to be separated.

This means that, in addition to the described ultrasound welding method, the activation and melting of the adhesive component or the soft component by infrared radiation, which is radiated onto the adhesive surface by means of an infrared emitter, is also suitable. It is placed below the adhesive surface so that the jets are absorbed by the soft component and it heats up.

Laser welding can be used as a further method for activating the adhesive surface or the soft component, respectively. In this case, the soft component is designed, by means of an additive, for absorbing the typical wavelength range in laser welding. The additive can in particular consist of soot particles to be added to a mass concentration so that the high-frequency laser waves allow an even heating by absorption on the soft component. After the adhesive surface has been activated, the closing disc can be placed on the hole and compressed.

According to a third example, a closing disc is provided for closing openings, in particular in motor vehicles. It comprises a plate-shaped, in particular approximately circular disc-shaped, carrier body made of a hard component with a covering side and a closing side, and a soft component, which is arranged only on the closing side, wherein the soft component is formed from an activatable adhesive material, and wherein the closing side is free of latching means for connecting to a carrier component, and wherein the carrier body preferably comprises a latching device for holding the closing disc in a reservoir or a magazine by means of a correspondingly configured latching means, and wherein the latching device extends radially outwardly approximately parallel to the plate-shaped carrier body. By contrast to adhesive pads known from the prior art, a hard component with a soft component is provided in the closing disc according to the disclosure. The closing disc according to the disclosure is therefore formed from a higher-quality material.

A high retention force is achieved by the soft component after the bonding, because the structural design of the closing disc allows the heated soft component to be arranged on an opening of a carrier component when bonded, so that a greater retention force is achieved by an increased circular disc-shaped adhesive surface. In addition, in the region in which the soft component is arranged after bonding, a corrosion protection of the carrier component also takes place. Because the closing disc according to the disclosure consists only of two simply constructed components, it is simple and inexpensive to manufacture. In particular, the closing disc according to the disclosure is wherein openings with different diameters or different hole diameters can be sealed with the same closing disc. Furthermore, the closing disc according to the disclosure is wherein a latching device is integrally formed on the carrier body. By means of this latching device, which extends radially outwardly approximately parallel to the extension of the carrier body, the closing disc can be held in a reservoir of an apparatus for closing openings in carrier components by means of correspondingly configured latching means of the reservoir.

The latching device can be configured as a radially circumferential catching edge or as a plurality of radially circumferential latching portions that are preferably equally spaced apart from one another. The angles at the undercut of the catching edge or latching portions are configured such that the closing disc can be automatically pushed into a reservoir with correspondingly configured latching means in a simple manner, and wherein a closing disc can be easily separated from the remainder of the held closing discs during the closing of an opening of a carrier component. On a radially outer edge of the closing side of the carrier body, a radially circumferential stopper wall, which extends orthogonally to a surface of the closing side, can be provided on the side wall of the carrier body so as to abut a carrier component.

This stopper wall serves on the one hand as a spacer between the closing disc and a surface of a carrier component, so that the closing discs are always arranged on an opening in the same manner. In addition, the stopper wall prevents the pressing out or pushing out or leakage of the soft component from the region of the closing disc, because the liquid soft component cannot flow further away on the stopper wall.

On the carrier body, a preferably circular cylindrical centering/distancing element can be integrally formed on the closing side. This centering/distancing element serves on the one hand as a spacer when a plurality of closing discs are held in a reservoir so that the closing discs do not lie on top of one another with their soft component, but rather can be arranged spaced apart from one another by the centering/distancing element. In addition, with a corresponding diameter of an opening, the centering/distancing element provides that the closing disc is centrally arrangeable on an opening.

In particular, when an opening to be closed is vertically arranged, the centering/distancing element prevents the closing disc from sliding downwards in the vertical direction if the soft component is not yet cured. In this way, it is also ensured that the closing disc can securely and reliably close an opening.

The centering/distancing element thus spaces the hard component of a first closing disc from a soft component of a second closing disc arranged above it in a vertical direction. Furthermore, the centering/distancing element ensures that the closing disc falls off a surface of a carrier component in the event of an incorrect positioning, because, if the centering/distancing element is not arranged in the region of the opening, the heated or softened soft component is arranged spaced apart from the surface of the carrier component such that the closing disc does not adhere to the carrier component. In this way, additional process assurance is enabled.

The soft component can be circular disc-shaped and can preferably terminate flush with the radially circumferential stopper wall and/or preferably flush with the centering/distancing element. Furthermore, the centering/distancing element can extend in the axial direction beyond the soft component, wherein a surface of the soft component opposite the closing side of the carrier component can be convex. The soft component can cover about more than 50%, or about more than 60%, or about more than 70% of a surface of the closing side. In particular, it can be provided that the hard component is formed from a very low-cost material, because the carrier body is only configured so as to support the soft component and seal the opening.

A recyclate can in particular be used for this purpose, so that the apparatus is environmentally friendly. The hard component can also be formed of PPT or PPA, in each case with fiberglass. The soft component can be formed from TPE or TPS, in each case with a heat-activatable adhesive or EVA. In addition, the soft component can have a lower melting temperature than the hard component. That is to say, the hard component can be made of a relatively inferior and therefore cheap material, as it is only used as a carrier disc and must only be able to withstand environmental influences.

The closing disc according to the disclosure is therefore highly competitive and environmentally friendly. Furthermore, according to the present disclosure, a method for producing a closing disc according to the disclosure is provided, wherein the closing disc is produced by means of a 2-component injection molding process.

In addition, according to the present disclosure, an apparatus for sealingly closing an opening of a carrier component, in particular of a motor vehicle, having a closing disc as described above is provided. It comprises: a tubular reservoir having an output side for outputting a closing disc, an output device for pushing a closing disc out of the reservoir, a heating device, which can in particular be arranged radially circumferentially around the reservoir, wherein the reservoir and the heating device are slidable in the axial direction relative to one another.

The apparatus can preferably be arranged on a robotic arm. Furthermore, a suction device for the suction of gases, vapors, and in particular heat produced during the assembly of the closing disc can also be provided. The advantages of the apparatus according to the disclosure are explained in further detail below using a method according to the disclosure for sealingly closing a carrier component.

According to the disclosure, a method for sealingly closing a through-opening of a carrier component, in particular a motor vehicle, is provided with an apparatus as described above. The method comprises the following steps: heating the closing disc by means of a heating device of the apparatus until the soft component is activated or melted, preferably discharging gases and/or vapors and/or heat by means of the suction device, pushing out a closing disc from the reservoir by means of an output device, such that the closing disc is arranged on an edge that delimits a through-opening of a carrier component and is sealingly connected to the edge of the through-opening. It can preferably be provided that the soft component is at least partially connected to an inner sheath wall of a through-opening of a carrier component.

According to the present disclosure, a 2-component adhesive disc is thus provided, which is heatable and mountable, or is heated and mounted, with the aid of an apparatus according to the disclosure (setting gun). The apparatus or setting gun comprises the reservoir or a hopper in which the closing discs are stacked. Furthermore, a suction device such as a suction bell can be provided for extracting heat and vapors. The heating device can form a heating chamber in which 300° hot air is generated and blown onto the adhesive part or the soft component, respectively.

The automated solution according to the disclosure with a simply constructed closing disc is characterized by the fact that it is independent, fast, simple, inexpensive, and safe. By being mountable on a robotic arm, the apparatus can be moved freely in the space.

The heating device can comprise an annular gap from which the hot air exits. The closing disc or adhesive disc arranged in the reservoir is then placed in front of the annular gap and the fan is turned on. The approximately 300° hot air is blown onto the adhesive surface, wherein after approximately 10 seconds the adhesive is soft and can be processed.

The adhesive component or the soft component is softened by the rapid supply of heat, so that it is glued to a surface of a carrier component or a sheet surface upon first contact. In particular, it is provided that a bonding takes place between an edge of the carrier component that delimits the opening of the carrier component and also with an inner sheath wall of the opening or a bore wall. In this way, the corresponding regions are preserved or protected from corrosion, and the retention force is increased.

The fan of the heating device is then switched off, and the reservoir is moved towards the component surface, e.g., by means of a first piston/cylinder device, until it is reached. Preferably, a sheet metal surface of a body is provided here.

The first piston/cylinder device continues to travel forward until the closing disc rests on a surface of the carrier component and the soft adhesive is pressed against the adhesive surface. At the same time, a second piston/cylinder apparatus of the output device is activated, and its cylinder then slides out about 2.8 mm. In this way, a defined contact pressure is applied to the closing disc so that a first closing disc is released from the reservoir when the retention force of the latching means in conjunction with the latching device is exceeded.

A package of closing discs remaining in the reservoir moves back to a home position along with the entire apparatus by means of the first piston/cylinder device. Then, the fan of the heating device can be turned on again, and the next cycle can begin.

The surface of the carrier component or the carrier component itself or the sheet metal dissipates the heat of the adhesive material relatively well and quickly, so that the closing disc is already arranged in a fixedly sealed manner on the carrier component after approximately 1 to 2 seconds and connected thereto. The overall cycle of assembling a closing disc does not take longer than 14 seconds.

In order to nevertheless perform a corresponding assembly process efficiently, the device can be revolver-like (not shown), in which four reservoirs along with the heating device and optionally corresponding suction devices are provided, so that the cycle time can be significantly reduced so that a closing disc can then be placed approximately every 3.5 seconds. Furthermore, according to the present disclosure, a method for filling the reservoir is provided.

Pre-manufactured closing disc packets could be provided here. Alternatively, the material can also be kept as bulk material, and the closing discs can be arranged in disc packets with the aid of a vibratory canister. Once the number of closing discs in the reservoir reaches a critical amount, the apparatus can move to a refilling station in order to fill the reservoir on its own.

The reservoir can then be arranged on a cylinder or filling device that is filled with closing discs, wherein a further first piston/cylinder device pushes a new packet of closing discs into the reservoir. The closing discs can have a radially circumferential insertion slope on the covering side, so that the reservoir or its latching means can spread automatically and can accommodate the closing discs.

In principle, according to the present disclosure, an apparatus for carrying out a method according to the present disclosure for sealingly closing an opening of a carrier component, in particular of a motor vehicle, having a closing disc according to the present disclosure is provided, comprising a reservoir for storing closing discs, and a device for generating ultrasound or for generating infrared radiation or for generating laser radiation or for generating hot air in order to melt the soft component.

All technical features of the individual examples of the present disclosure can be combined with one another as desired, insofar as technically possible and sensible.

Figure 2:
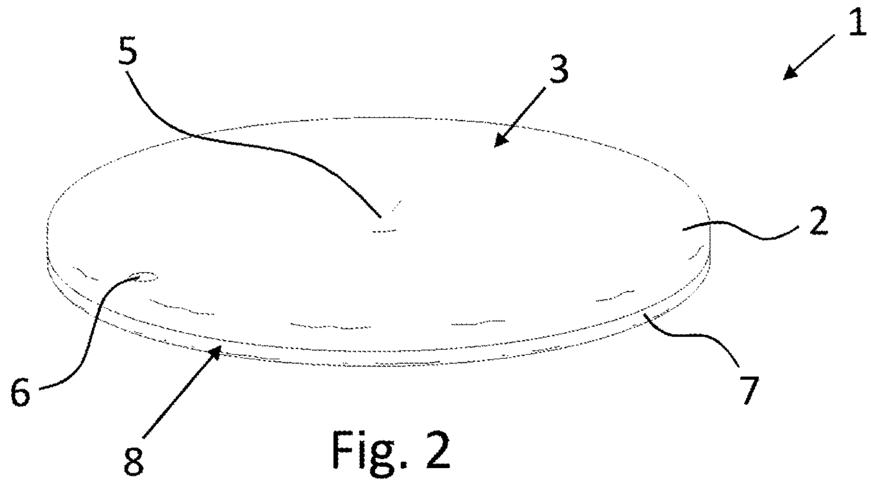
FIG. 2 illustrates a perspective aerial view of a covering side of the closing disc.
Figure 3:
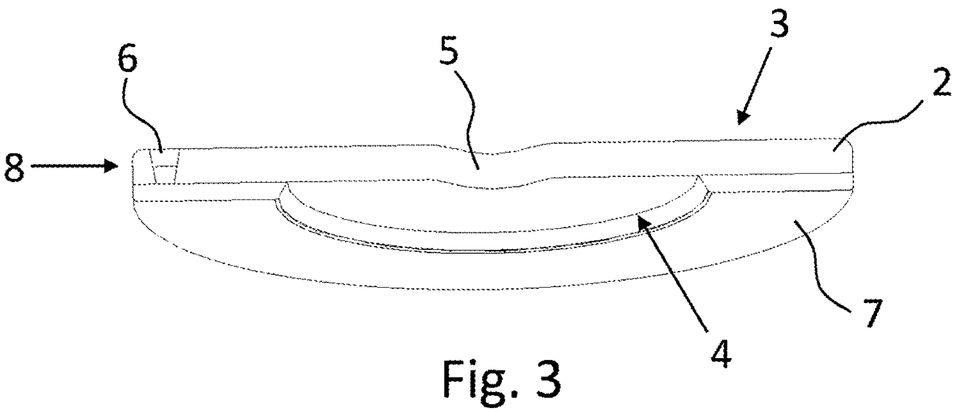
FIG. 3 illustrates a perspective laterally cut view of the closing disc.

Disclosed is a closing disc 1 according to the disclosure for closing openings, in particular openings preferably in motor vehicles, according to a first example is configured so as to be applied to an opening or an opening-delimiting edge of a carrier component. FIG. 1 illustrates a perspective aerial view of a closing side 4 of a closing disc 1 according to an aspect of the disclosure. FIG. 2 illustrates a perspective aerial view of a covering side 3 of the closing disc 1, while FIG. 3 illustrates a perspective laterally cut view of the closing disc 1. The closing disc comprises a completely circular disc-shaped carrier body 2. The carrier body 2 comprises a covering side 3 and a closing side 4.

The carrier body 2, in particular its covering side 3 and the closing side 4, are configured completely flat and circular in the aerial view. Due to the manufacture by means of an injection molding process, a sprue 5 is approximately centrally located on the covering side 3. In a radial edge region, an opening 6 for applying a soft component 7 is also provided.

In addition, a geometry of the carrier body 2 is adapted to a geometry of an opening of a component to be closed, in particular a body of a motor vehicle, and can accordingly also be approximately circular, approximately elliptical, or approximately oval, or even rectangular, polygonal, or square in shape. The closing side 4 is also configured so as to be completely flat, apart from the opening 6 and the sprue 5. The covering side 3 and the closing side 4 are connected to one another via a radially circumferential planar side wall 8.

On the closing side 4 of the carrier body 2, the circular disc-shaped soft component 7 is applied. The circular disc-shaped soft component 7 is formed from TPE or TBS, in each case with a heat-activatable adhesive or EVA. The soft component 7 is preferably activatable by means of ultrasound. In addition and/or alternatively, the soft component can also be melted or activated by means of laser, in particular laser welding, by means of hot air, or by means of induction or by means of infrared light.

The carrier body 2 is formed from a hard component made of PPT or PPA, in each case having a fiber content of preferably 50%. In particular, it is provided that the hard component is formed from a recyclate.

According to another example (not shown), the soft component 7 is circular disc-shaped and covers the entire closing side 4.

According to the two examples of the soft component 7, it is provided that the soft component 7 terminates approximately flat or flush with the radially circumferential side wall 8.

According to a further example (not shown), in which the soft component 7 is circular disc-shaped, it is provided that a hollow cylindrical centering/distancing element 10 is arranged approximately centrally in the closing side. Furthermore, according to the present disclosure, a method for producing an aforementioned closing disc 1 is provided by means of a 2-component injection molding process, wherein the carrier body 2 is first injection-molded in a first step and then, via the opening 6, the soft component 7 is applied to the closing side 4 in a second step. In addition, according to the present disclosure, a method for sealingly closing an opening of a carrier component, in particular of a motor vehicle, having the closing disc 1 is provided.

The closing disc is arranged on an edge that delimits an opening of a carrier component. Subsequently, the soft component of the closing disc is heated by means of a sonotrode of an ultrasonic device, such that the soft component is melted and sealingly welded to the edge of the opening. Particularly advantageously, it is also provided here that the soft component penetrates into the opening of a carrier component in the edge region in such a way that the soft component is also sealingly welded to an inner sheath wall of an opening.

Figure 4:
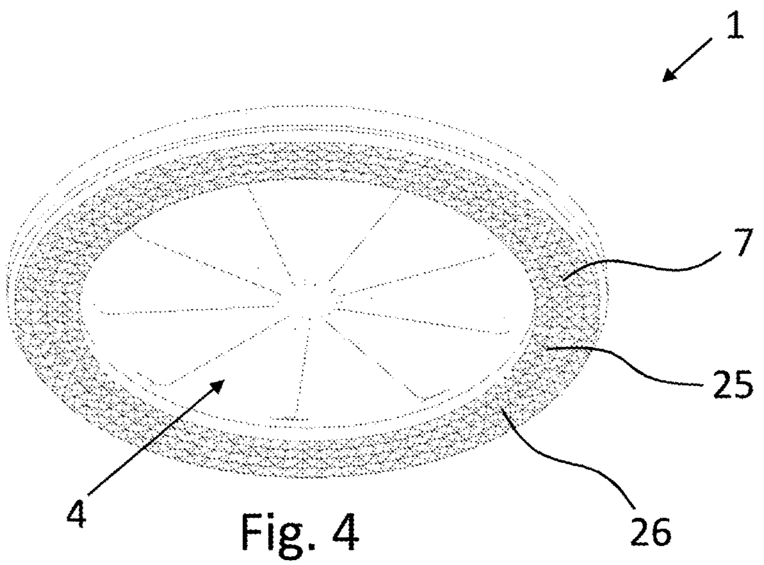
FIG. 4 illustrates a perspective view of a closing disc according to the disclosure according to a second example.
Figure 5:
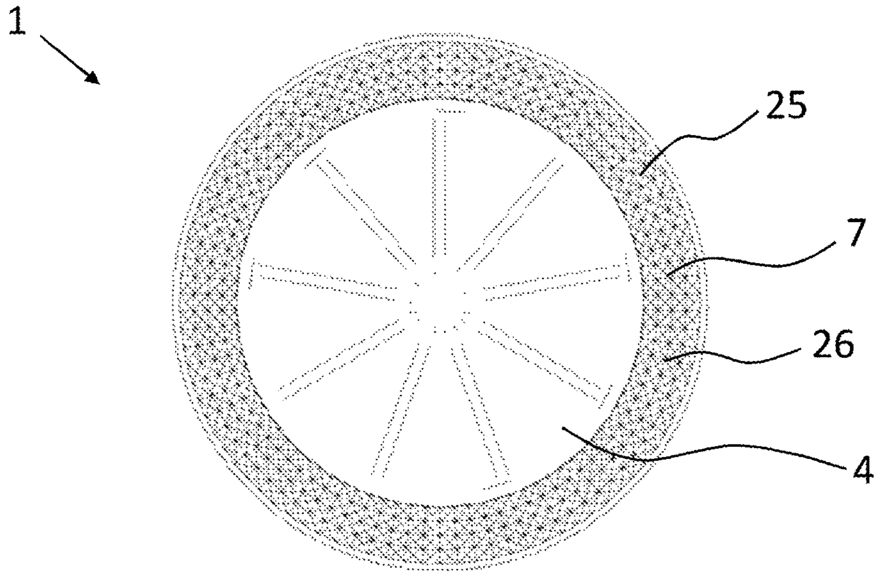
FIG. 5 illustrates the closing disc of FIG. 4 in an aerial view from the bottom.

A closing disc 1 according to a second example is further provided. FIG. 4 illustrates a perspective view of a closing disc 1 according to the disclosure according to the second example, while FIG. 5 illustrates the closing disc 1 of FIG. 4 in an aerial view from the bottom. Unless described otherwise, the closing disc 1 according to the second example has the same technical features as the closing disc 1 according to the first example. Identical technical features bear the same reference numerals.

The closing disc 1 according to the second example comprises a textured soft component 7. In the context of the present disclosure, a textured soft component 7 is understood to mean that the soft component 7 has a structure 25 on the closing side 4. In this structure 25, discharge channels 26 are configured so as to remove wax and/or impurities melted on a component during the application process, such that they can be discharged approximately radially outward when melting.

That is to say, the structure 25 forms discharge channels for removing wax and/or impurities that extend substantially radially outward.

For example, the structure 25 can be configured as a corrugated structure, a diamond structure, a honeycomb structure, and thus a vectored structure having at least approximately radially outward extending discharge channels that can be connected to one another.

Furthermore, the carrier body 2 of the closing disc 1 formed from a hard component is significantly thinner than in the first example. The carrier body 2 has a wall thickness of approximately 0.6 mm or 0.8 mm or 0.9 mm or 1 mm. In order to compensate for the weakening associated with the thinner wall thickness of the carrier body 2, the closing disc 1 according to the second example comprises on the closing side stiffening ribs 27 that extend radially circumferentially and are equally spaced apart from one another in the radial outward direction.

An example can also be provided, which is similar to the first example of the closing disc 1, in which the hard component is configured flat without stiffening struts, wherein only the soft component 7 is configured in a correspondingly structured fashion.

Figure 6:
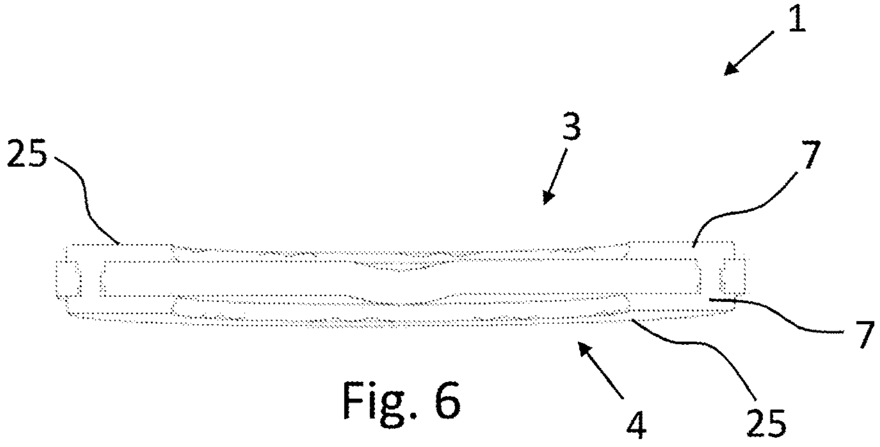
FIG. 6 illustrates a laterally cut illustration of an alternative example of a closing disc according to the disclosure.

In an alternative example of a closing disc 1 according to the disclosure, the soft component can be applied in an annular or circular disc shape on both sides of the carrier body 2. FIG. 6 illustrates a laterally cut illustration of an alternative example of a closing disc 1 according to the disclosure. In this case, one or more openings 6 can then be provided radially circumferentially in order to apply the soft component 7 on both sides to the carrier body 2 of the closing disc 1.

Figure 7:
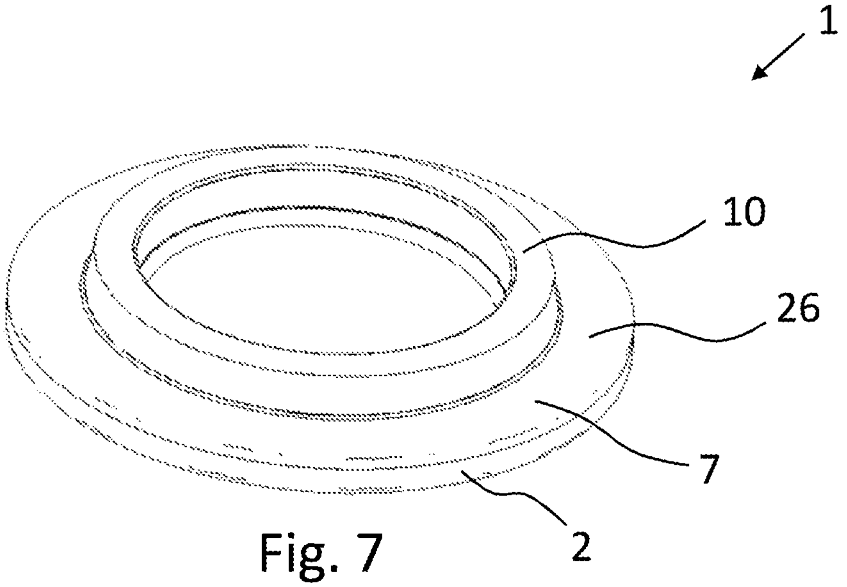
FIG. 7 illustrates a perspective view of a closing plug according to the disclosure according to a third example.

FIG. 7 illustrates a perspective view of a closing plug according to the disclosure according to a third example. In the following, a further example of a closing disc 1 according to the disclosure is described in further detail. Unless otherwise described, this closing disc 1 can have the same technical features as the closing discs 1 described above. Identical technical features bear the same reference numerals.

The closing disc 1 according to this example comprises a centering/distancing element 10 in addition to the aforementioned features, which can be combined as desired with one another. This centering/distancing element 10 serves as a centering aid for arranging the closing disc 1 in a reproducible position on a closed opening, which is repeatedly the same mounting position.

The centering/distancing element 10 is integrally formed as a circular annular portion on the carrier body 2 and connected thereto. That is to say, the centering/distancing element 10 is also formed from the hard component, i.e., is a component of the carrier body 2. The centering/distancing element 10 can be arranged in an opening that is to be closed in order to allow a reproducible and correct arrangement of the closing disc 1 in an opening. With such a centering aid or the centering/distancing element 10, a corresponding process in which an inner sheath wall of a through-opening, in particular a sheet edge, is also to be sealed, is more easily reproducible.

In the case of closing discs 1 according to the disclosure, it can be provided that the soft component 7 has an increased layer thickness at two diametrically opposed regions in order to compensate for any curvatures existing in the region of openings to be closed. This means that the closing disc 1 or its soft component 7 has a slightly convex shape after application, in order to be applicable to curved surfaces, as well.

Closing discs 1 according to the disclosure can also be applied internally to an opening of a component that is to be closed. The soft component 7, in particular if it is annular in shape, must have a significantly smaller inner diameter than the opening to be closed. In this way, when the soft component is activated, it can enter an inner sheath wall of the opening to be closed and can thus effectively protect it against corrosion.

In the event that a closing disc 1 is applied from the outside to an opening of a component that is to be closed, this is not so critical, because the inner sheath wall of the opening to be closed is not exposed after the application of the closing disc 1.

Figure 8:
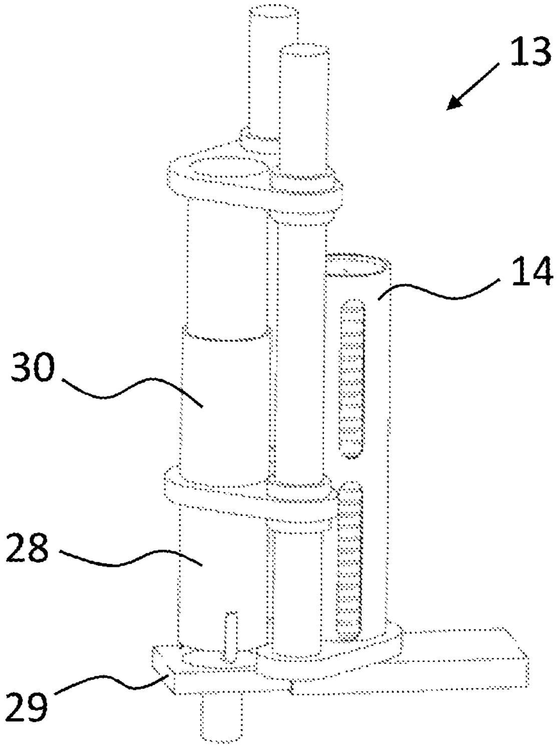
FIG. 8 illustrates a perspective view of an apparatus according to the disclosure for the application of closing discs.

FIG. 8 illustrates a perspective view of an apparatus according to the disclosure for the application of closing discs 1. Furthermore, according to the present disclosure, an apparatus 13 for applying closing discs 1 according to the present disclosure is provided.

This apparatus comprises a reservoir 14 or a hopper for receiving the closing discs 1. The reservoir 14 comprises a movable cylinder that allows the closing discs 1 to be moved to a frontmost position of the reservoir 14.

A corresponding retention apparatus is also provided for fixing the closing discs 1 in this position. A front closing disc 1 is then inserted into a separating apparatus 29 and pressed into a mounting position below an ultrasonic welding device 30 for positioning. The welding device 30 comprises a sonotrode, a booster, a converter, and a forward-feed unit which can be operated by the vibratory system. The vibratory system is connected to a generator that supplies the electrical waves to generate the ultrasonic waves in the converter.

When using the laser welding or infrared process, the applicator differs in that the closing discs 1 can be applied directly out of the magazine and no longer need to be separated.

This means that, in addition to the described ultrasonic welding method, the activation and melting of the adhesive component or the soft component 7 by infrared radiation, which is radiated onto the adhesive surface by means of an infrared emitter, is also suitable. It is placed below the adhesive surface so that the jets are absorbed by the soft component 7 and it heats up.

Laser welding can be used as a further method for activating the adhesive surface or the soft component 7, respectively. In this case, the soft component 7 is designed, by means of an additive, for absorbing the typical wavelength range in laser welding. The additive can in particular consist of soot particles to be added to a mass concentration so that the high-frequency laser waves allow an even heating by absorption on the soft component. After the adhesive surface has been activated, the closing disc 1 can be placed on the hole and compressed.

Figure 9:
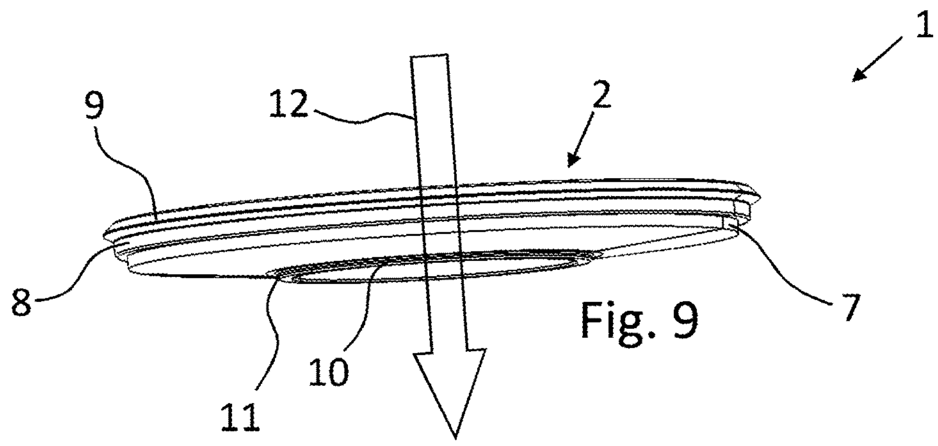
FIG. 9 illustrates a perspective lateral view of a closing disc according to the disclosure according to a third example.
Figure 10:
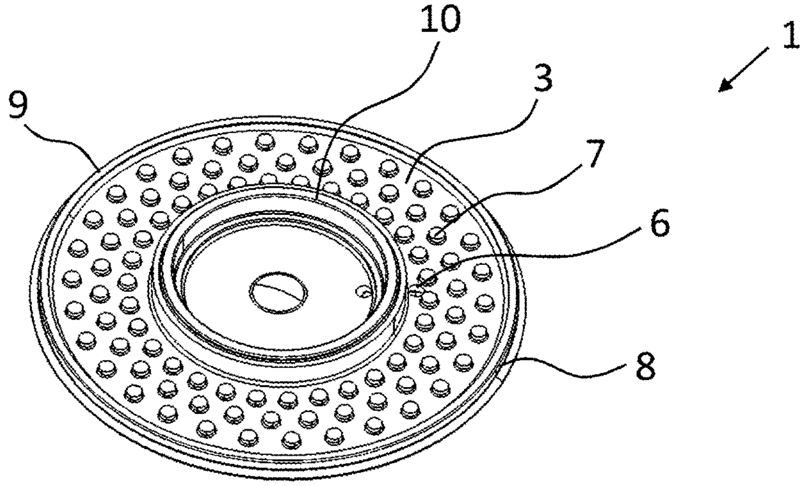
FIG. 10 illustrates a perspective aerial view of a closing side of a carrier body of the closing disc without the soft component.
Figure 11:
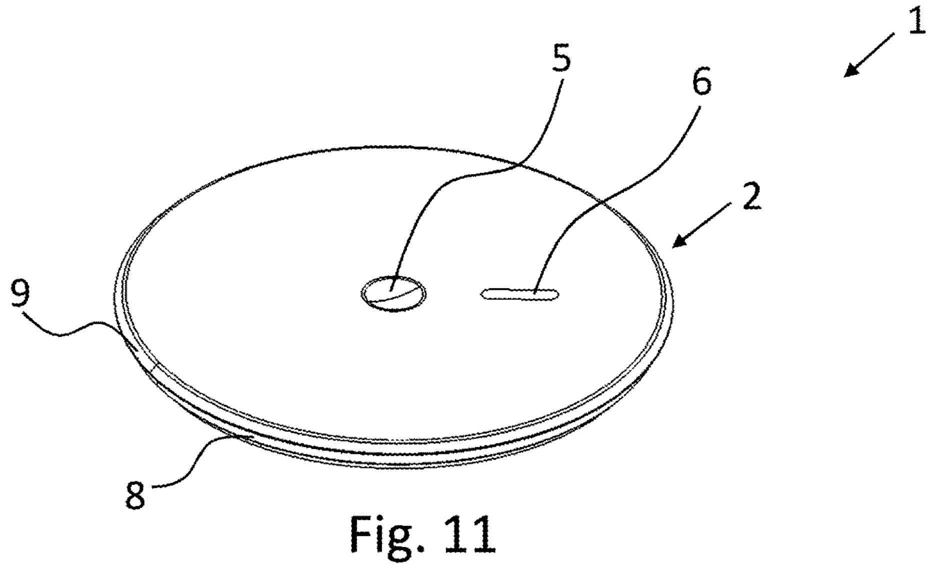
FIG. 11 illustrates a perspective aerial view of a covering side of the closing disc with the soft component.

FIG. 9 illustrates a perspective lateral view of a closing disc 1. FIG. 10 illustrates a perspective aerial view of a closing side 4 of a carrier body 2 of the closing disc 1 without the soft component, while FIG. 11 illustrates a perspective aerial view of a covering side 3 of the closing disc 1 with the soft component. In the following, a closing disc 1 according to the disclosure for closing openings in carrier components, in particular in motor vehicles, is described in further detail according to a third example. The closing disc comprises a carrier body 2. The carrier body 2 comprises a covering side 3 and a closing side 4.

The carrier body 2 is formed from a hard component in an approximately circular disc shape. On the covering side 3, a sprue 5 and a through-opening 6 are provided due to the manufacturing process.

Furthermore, a radially outwardly extending latching device 11 is integrally formed on a radially circumferential side wall 8 of the carrier body. The latching device 11 is configured as a radially circumferential catching edge and extends radially outward parallel to the carrier body 2. Alternatively, the latching device can also be formed from a plurality of catching sections equally spaced apart from one another (not shown).

Furthermore, a radially circumferential stopper wall 9, which extends orthogonally to a surface of the closing side 4, is integrally formed on the side wall 8 of the carrier body so as to abut a carrier component.

An annular, cylindrical centering/distancing element 10 is formed approximately centrally on the closing side of the carrier body. In the region between the stopper wall 9 and the centering/distancing element 10, a soft component 7 of the closing disc is applied. A free surface of the soft component 7 opposite the closing side 4 of the carrier body is convexly formed.

Furthermore, the centering/distancing element 10 extends beyond the soft component in an axial direction 12 so that the centering/distancing element can also be used as a spacing device between two individual closing discs 1, such that the soft component of a closing disc 1 does not contact a covering side 2 of a further closing disc.

According to a method according to the disclosure for the production of a closing disc 1, the closing disc is produced by means of a 2-component injection molding process.

Figure 12:
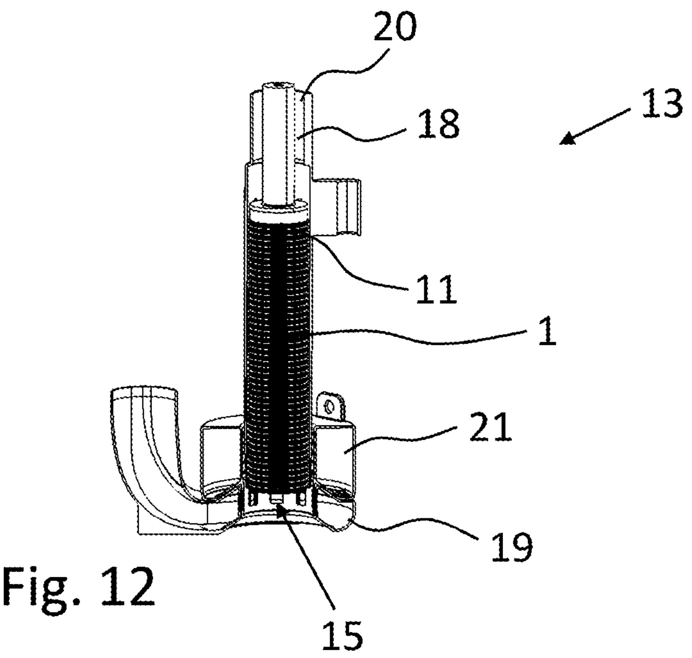
FIG. 12 illustrates a perspective laterally cut view of an apparatus for closing openings by means of closing discs.
Figure 13:
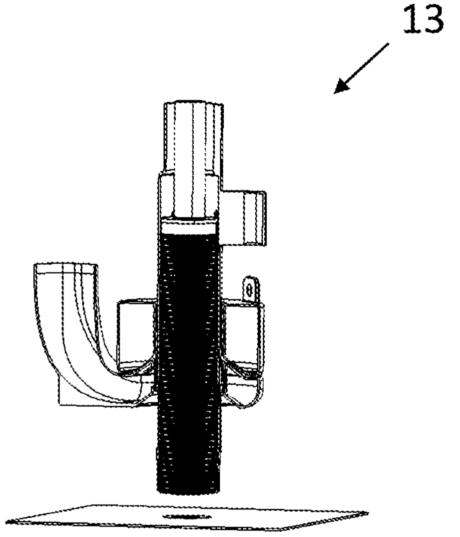
FIG. 13 illustrates the apparatus in a home position.
Figure 14:
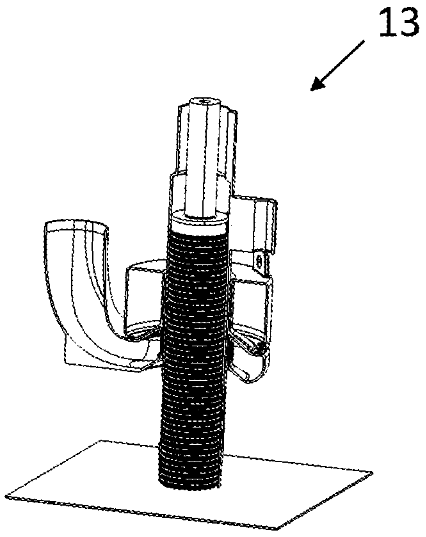
FIG. 14 illustrates the apparatus in a home position, arranged on a carrier component.
Figure 15:
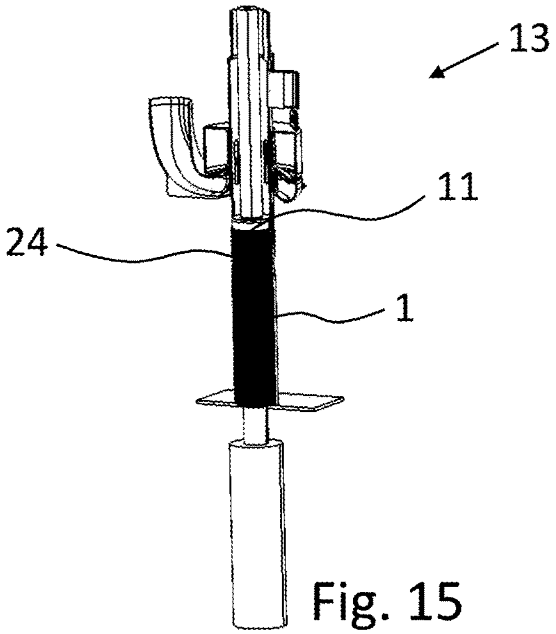
FIG. 15 illustrates a perspective laterally cut view when filling a reservoir of the apparatus.
Figure 16:
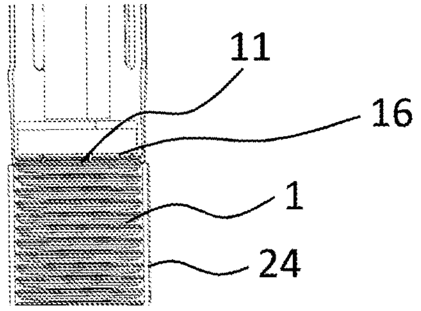
FIG. 16 illustrates a laterally cut view of the apparatus when filling the reservoir.
Figure 17:
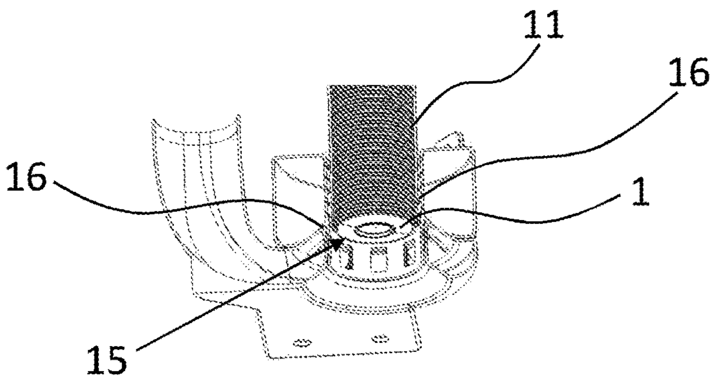
FIG. 17 illustrates a perspective detail view of closing discs held in the reservoir of the apparatus.

FIG. 12 illustrates a perspective laterally cut view of an apparatus for closing openings by means of closing discs 1. FIG. 13 illustrates the apparatus in a home position, while FIG. 14 illustrates the apparatus in a home position, arranged on a carrier component. FIG. 15 illustrates a perspective laterally cut view when filling a reservoir of the apparatus. FIG. 16 illustrates a laterally cut view of the apparatus when filling the reservoir, while FIG. 17 illustrates a perspective detail view of closing discs 1 held in the reservoir of the apparatus. In the following, an apparatus 13 according to the disclosure for sealingly closing a through-opening of a carrier component, in particular of a motor vehicle, having a closing disc 1 is described. The apparatus 1 comprises a hollow cylindrical reservoir 11 in which a plurality of closing discs 1 can be received in a stacked state.

On an output side 15 of the reservoir 11, a radially circumferential latching means 16, configured so as to correspond to the latching device 11, is provided with a catching edge extending inwardly in the radial direction, wherein the latching means 16 is configured resiliently so that the closing discs 1 can be pressed out of the reservoir in the axial direction 12 by subjecting them to a force of an output device 17 acting in the axial direction 12. Furthermore, the reservoir 11 comprises ventilation slits 18 for discharging thermal energy from the reservoir.

The apparatus 13 also comprises a heating device 19. The heating device 19 is approximately annular in shape, such that the reservoir 11 and heating device 19 are slidable relative to one another by means of a first piston/cylinder device (not shown). The heating device 19 uses a fan device (not shown) that allows at least the soft component 7 of the closing disc 1 to be heated to 300°. The apparatus also comprises a suction device 21 for removing vapors and/or gases and/or heat from the reservoir 11 of the apparatus 13.

The suction device 21 is also movable together with the heating device, preferably by means of the first piston/cylinder device 20. The suction device 21 is also approximately circular in shape. In addition, the reservoir 11 comprises an output device 20 that is configured as a second piston/cylinder device.

According to an alternative example, the apparatus 13 is revolver-like, comprising four of the above apparatuses 13 in order to shorten the cycle time when applying the closing discs to openings of carrier components (not shown).

In the following, a method according to the disclosure for sealingly closing an opening or a through-opening of a carrier component, in particular of a motor vehicle, is described in further detail with an apparatus 13 according to the disclosure.

The reservoir 11 of the apparatus 13 is arranged such that a disc, which is lower in the axial direction 12, is arranged in the region of an annular gap for emitting hot air 23 of the heating device. Then, both the heating device 19 and the suction device 21 are turned on in order to heat the soft component 7 of the closing disc 1. Subsequently, the heating device 19 and the suction device 21 are moved relative to the reservoir 11 of the apparatus 13 such that the reservoir with its output side 15 protrudes from the heating device 19.

Subsequently, a bottommost closing disc 1 held in the reservoir is placed on an edge region which delimits an opening of a carrier component. Thereafter, this closing disc 1 is pressed against the edge region of the opening by means of the output device 20, wherein, in the same operation, the latching means 16 of the apparatus is extruded or pushed outward in a radial direction by subjecting the closing disc to a compressive force acting in the axial direction such that the latching means no longer rearwardly engages with the latching device 11 of the closing disc 1 and releases the closing disc 1.

In addition, the closing disc is pressed against the edge region of the opening of the carrier component with a certain contact pressure until the stopper wall 9 abuts the surface of the carrier component. The soft component sealingly bonds the closing disc 1 to the edge region of the opening, wherein the liquid adhesive material of the soft component also flows into an inner sheath wall of the opening via the edge of the opening, so that an adhesive connection is also formed there.

A method according to the revolver-like apparatus 13 is carried out analogously according to the method of the apparatus 13, wherein it is merely provided that different apparatuses 13 are used in order to reduce the cycle time (FIGS. 7 and 8).

To fill the reservoir, a filling device 24 with a cylinder can be provided, in which a plurality of closing discs 1 are stacked one on top of the other. The reservoir is then arranged in the region of the cylinder, wherein, by means of a further piston/cylinder device, the closing discs 1 can be arranged in the reservoir by widening the latching means 16 of the reservoir 11.

What is claimed is:

1. A closing disc for closing openings in motor vehicles, comprising:

a plate-shaped carrier body made of a hard component with a covering side and a closing side; and a soft component arranged on the closing side, wherein the soft component is formed from an activatable adhesive material, and has a structure on the closing side, and wherein discharge channels are configured in the structure which extend at least in sections approximately outwardly towards an edge of the carrier body, and wherein the closing disc is free of latching means for latching the closing disc in an opening.

2. The closing disc according to claim 1, wherein discharge channels extend radially outwardly towards an edge of the carrier body.

3. The closing disc according to claim 1, wherein the soft component is meltable or activatable via one or more of ultrasound, laser, hot air, induction, or infrared light.

4. The closing disc according to claim 1, wherein a centering/distancing element is formed on the carrier body on the closing side.

5. A closing disc according to claim 1, wherein the carrier body comprises a planar covering side and a closing side that is similarly planar and a planar circumferential side wall, such that a surface of the carrier body only consists of these three planar surfaces.

6. A method for manufacturing a closing disc according to claim 1, wherein the closing disc is manufactured by means of a 2-component injection molding process.

7. A method for sealingly closing an opening of a carrier component of a motor vehicle, having a closing disc according to claim 1, wherein the closing disc is arranged on the edge that delimits the opening of a carrier component, and subsequently a soft component of the closing disc is thermally activated such that the soft component is melted and sealingly connected to the edge of the opening.

8. The method according to claim 7, wherein the soft component is at least partially connected to an inner sheath wall of the opening of the carrier component when the soft component is thermally activated.

9. The method according to claim 7, wherein the soft component is melted or activated via one or more of ultrasound, laser, hot air, induction, or infrared light.

10. An apparatus for carrying out a method for sealingly closing an opening of a carrier component of a motor vehicle, according to claim 7 with a closing disc according to claim 1, the apparatus comprising:

a reservoir for storing closing discs; and a device for generating ultrasound or for generating infrared radiation or for generating laser radiation or for generating hot air in order to melt the soft component.

11. A closing disc for closing an opening, comprising:

a plate-shaped carrier body formed of a hard component and having a covering side and a closing side of equal diameter; and an annular soft component disposed on the closing side, wherein the soft component comprises an activatable adhesive material, wherein the carrier body and the annular soft component define a horizontal plane that, prior to activation, is positionable above the opening, and wherein the closing disc is free of latching structure for securing the closing disc in the opening.

12. The closing disc of claim 11, wherein an inner diameter of the annular soft component is smaller than a diameter of the opening and is bondable to an edge of the opening upon activation of the soft component.

13. The closing disc of claim 11, wherein the soft component is activatable by one or more of ultrasound, laser radiation, hot air, induction, or infrared radiation.

14. The closing disc of claim 11, wherein the carrier body includes a centering or distancing element on the closing side, the centering or distancing element being receivable in the opening.

15. The closing disc of claim 11, wherein the carrier body comprises a planar covering side, a planar closing side, and a planar circumferential side wall, such that an exterior surface of the carrier body consists of only said covering side, closing side, and circumferential side wall.

16. A method for manufacturing the closing disc of claim 11, the method comprising:

forming the carrier body in a first injection-molding step; and applying the soft component to the closing side of the carrier body in a second injection-molding step via an opening in the covering side.

17. A method for sealingly closing an opening of a carrier component using the closing disc of claim 11, the method comprising:

positioning the closing disc on an edge delimiting the opening; and thermally activating the soft component such that the soft component melts and sealingly bonds to the edge of the opening.

18. The method of claim 17, wherein, upon thermal activation, the soft component is at least partially bonded to an inner wall of the opening of the carrier component.

19. The method of claim 18, wherein the soft component is thermally activated by one or more of ultrasound, laser radiation, hot air, induction, or infrared radiation.

* * * * *